United States Patent [19]
Ritter

[11] 3,874,006
[45] Apr. 1, 1975

[54] ORGANIC COMPOST COLLECTOR FOR SINK DRAIN SYSTEM

[76] Inventor: Ann Lance Ritter, 1001 Balmoral Dr., Nashville, Tenn. 37220

[22] Filed: Mar. 4, 1974

[21] Appl. No.: 447,841

[52] U.S. Cl............................................ 4/189, 4/287
[51] Int. Cl......... E03c 1/18, E03c 1/26, A47k 1/14
[58] Field of Search............ 4/166, 167, 187 R, 189, 4/286, 292; 210/162, 254, 323

[56] References Cited
UNITED STATES PATENTS
| | | | |
|---|---|---|---|
| 1,116,544 | 10/1914 | Barker | 4/286 |
| 2,512,867 | 6/1950 | Marcussen | 4/287 |
| 3,274,622 | 9/1966 | Venison et al. | 4/287 |

*Primary Examiner*—Leonard D. Christian
*Attorney, Agent, or Firm*—Harrington A. Lackey

[57] ABSTRACT

An organic compost collector adapted to be removably installed in a sink drain system, including a housing having an inlet in fluid communication with the sink drain outlet and an outlet in fluid communication with the drain pipe. A screen member is mounted within the housing to block the flow of solid waste matter and to permit the flow of liquid through the outlet opening of the housing, thereby retaining and collecting within the housing the solid waste material discharged through the sink drain outlet.

A feature of some of the modifications is the inclusion of a by-pass conduit between the sink drain outlet and the drain pipe, and a valve adapted to selectively divert effluent through the housing or through the by-pass conduit.

Some modifications of the device are adapted to be detachably connected directly to the sink drain outlet, and others are adapted to be connected to the outlet of a food disposer mounted beneath and in fluid communication with the sink drain outlet.

13 Claims, 12 Drawing Figures

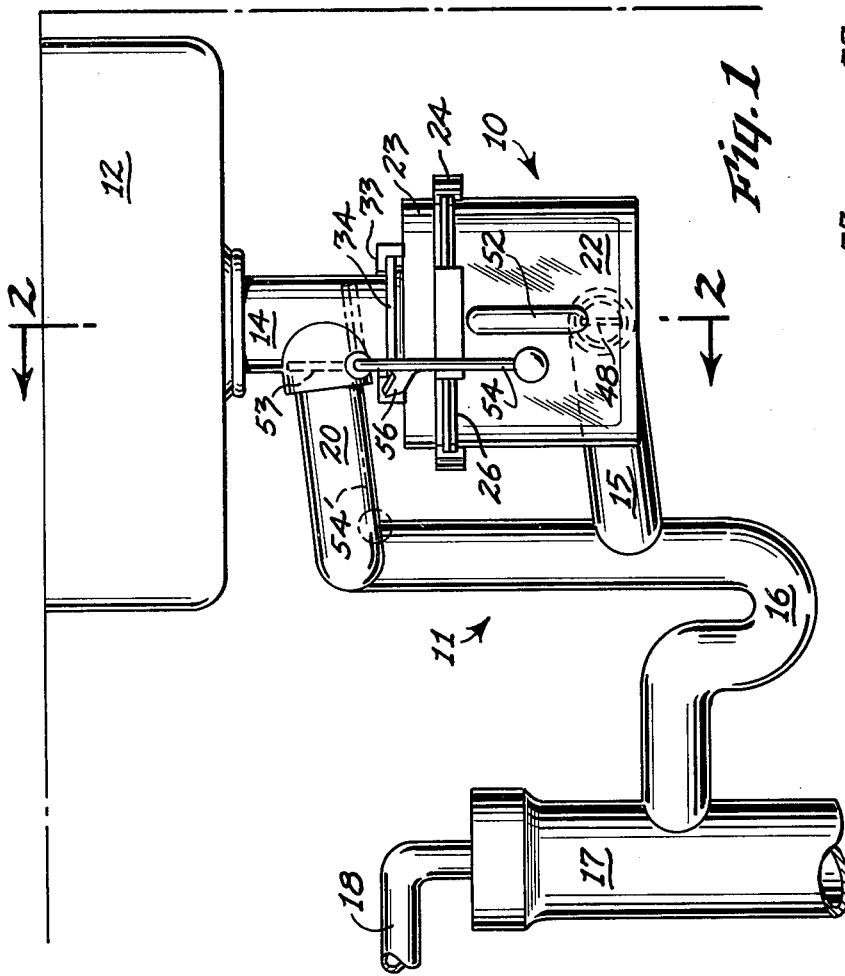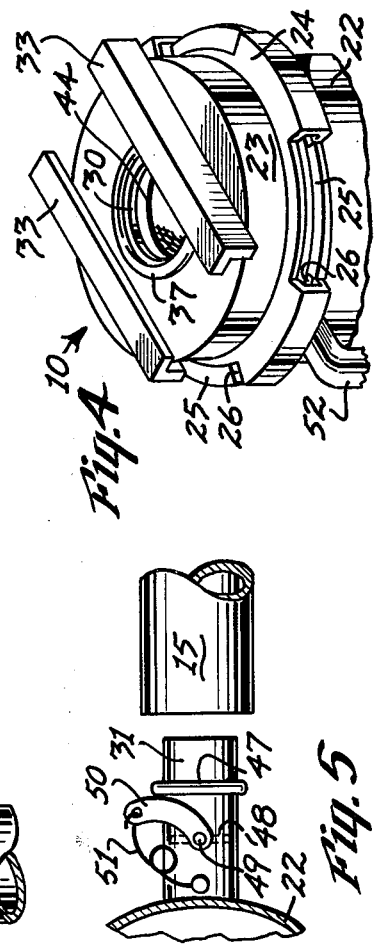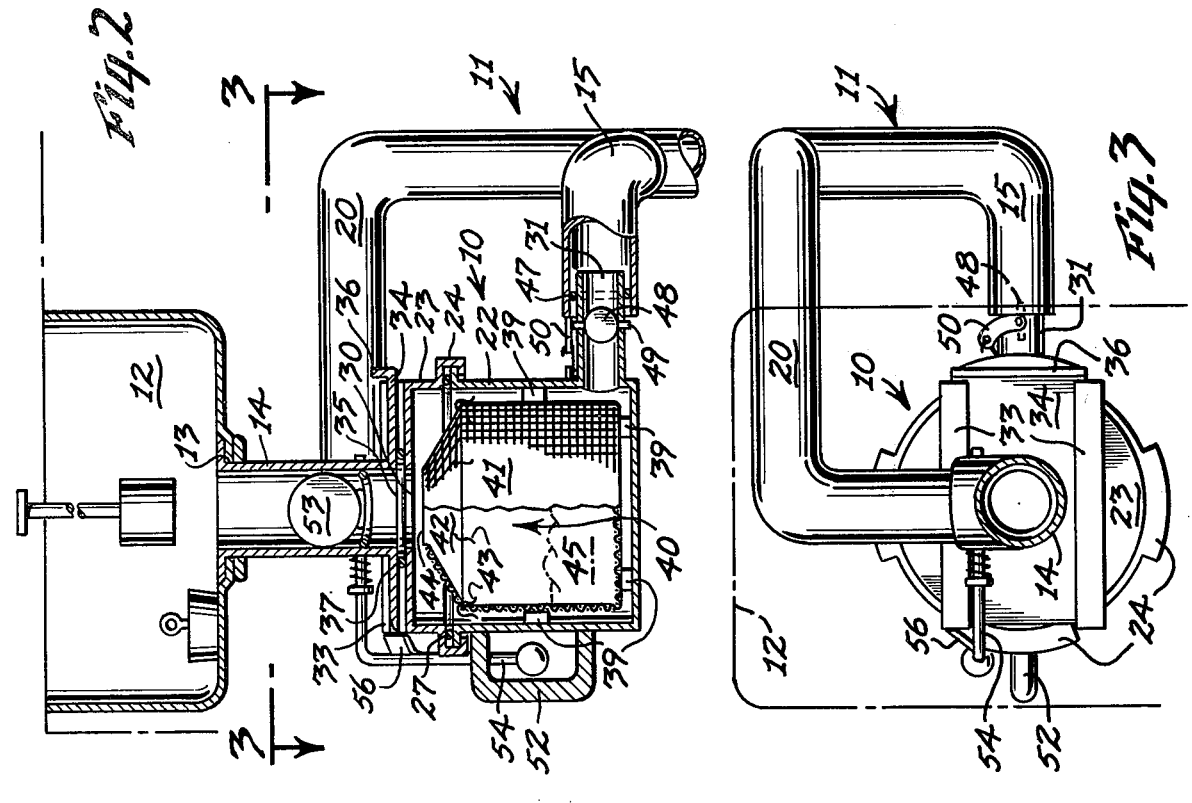

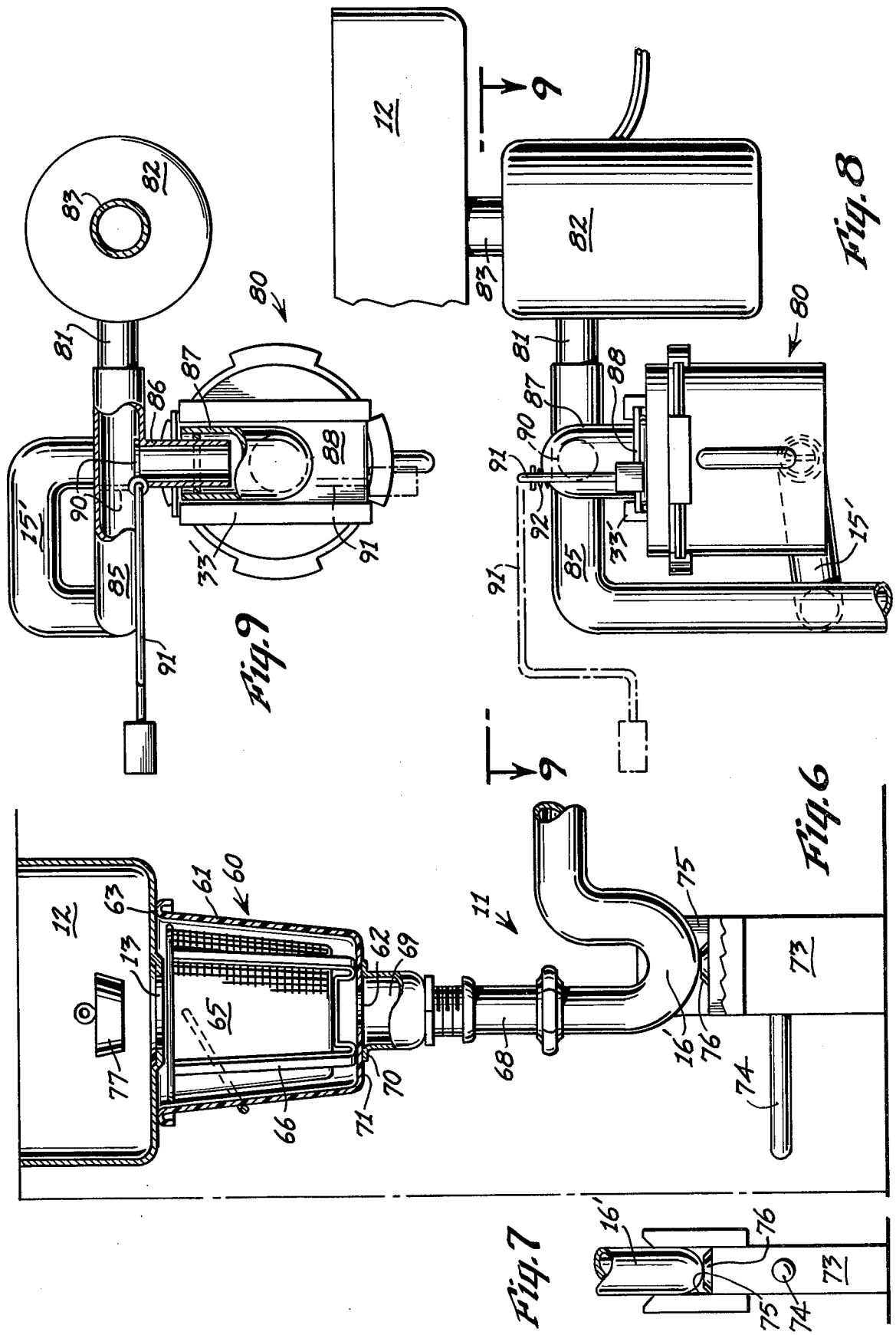

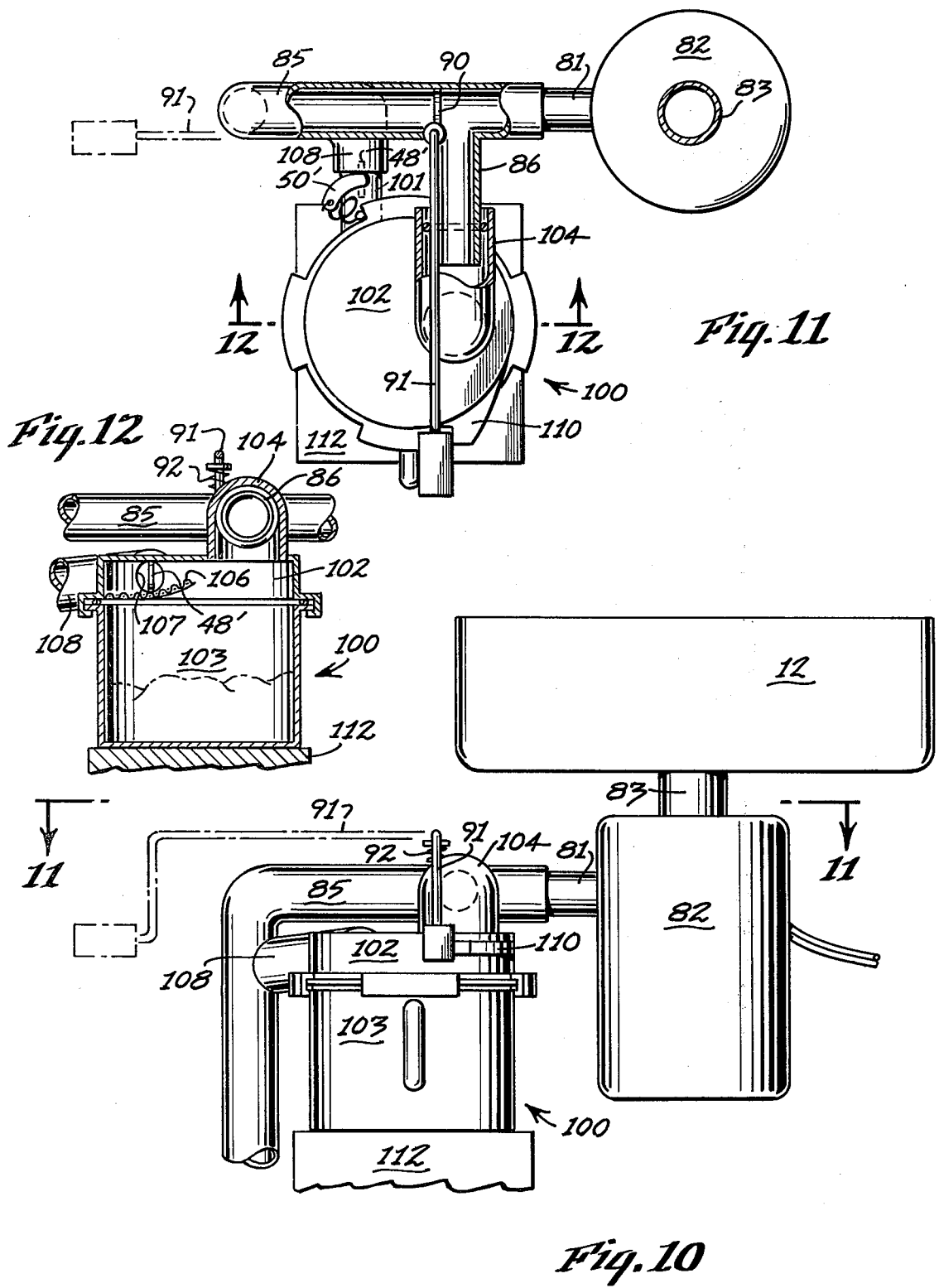

ORGANIC COMPOST COLLECTOR FOR SINK DRAIN SYSTEM

BACKGROUND OF THE INVENTION

This invention relates to an organic compost collector, and more particularly to an organic compost collector for a sink drain system.

Heretofore, organic waste matter from foods was customarily deposited in garbage receptacles of various types and removed from both domestic and commercial establishments by means of municipal and private garbage collection trucks and delivered to incinerators, land fills, large bodies of water or pig farms.

More recently, food waste matter is washed down the kitchen or utility sink where it is ground up into fine particles by an automatic waste disposer and the ground particles flushed down the drain pipe to the sewer or septic tank.

In either of the above systems of disposing of food waste, the inherent value of the food waste material as an organic fertilizer is not utilized.

SUMMARY OF THE INVENTION

It is therefore an object of this invention to provide an organic compost collector particularly adapted for installation in a sink drain system, which will perform the double function of not only disposing of food waste matter, but also collecting the food waste matter for subsequent use as a compost or organic fertilizer.

The compost collector made in accordance with this invention includes a solid-wall receptacle or housing having an inlet opening and an outlet opening.

Appropriate fittings or connectors are provided for detachably connecting the inlet opening in fluid communication with the drain outlet of the sink. In a similar manner, appropriate fittings or connectors are provided for detachably connecting the outlet opening of the housing in fluid communication with the drain pipe. Within the housing is a screen member which may take various forms for permitting the free passage of water and other fluids, yet blocking solid waste materials above a predetermined size from passage through the outlet opening in order to retain the solid waste matter within the housing. A preferred form of screen member is a screen basket or container mounted within the housing so that its walls are slightly spaced from the walls of the housing in order to collect the maximum amount of food waste material within the housing, yet to freely permit the water to drain from the housing.

Some modifications of the collector are adapted for connection to the outlet of a food disposer.

All the modifications of the collector are adapted so that they have fluid-tight connections when installed in communication with the drain pipe in the sink, yet are easily removable from the drain system for emptying their contents.

Preferably, means are provided for blocking the passage of fluid through the sink drain outlet when the collector is removed from the drain system. In one form of such apparatus, a fluid by-pass conduit is connected between the sink drain outlet and the drain pipe to by-pass the compost collector. A manually operated valve permits selective passage of the fluid from the sink either through the by-pass conduit or through the compost collector housing.

In one form of the invention, the outlet from the housing is provided with a self-closing valve when detached from the drain pipe, but which is actuated by engagement with the drain pipe when reconnected to the housing outlet to automatically open the outlet valve.

In a simplified version of the collector, a biasing mechanism is provided for squeezing the collector housing between the bottom of the sink and the drain pipe so that the sink drain outlet, collector housing and drain pipe, are all in tight fluid communication, and yet the collector housing is readily removable by relieving the squeezing action of the drain pipe and the sink upon the collector housing.

BRIEF DESCRIPTION OF THE DRAWINGS

FIG. 1 is a side elevation illustrating one form of the collector housing installed in a sink drain system;

FIG. 2 is a section taken along the line 2—2 of FIG. 1;

FIG. 3 is a section taken along the line 3—3 of FIG. 2;

FIG. 4 is a fragmentary top perspective view of the collector housing illustrated in FIGS. 1–3;

FIG. 5 is an enlarged fragmentary plan view of the housing outlet conduit disconnected from the drain pipe;

FIG. 6 is a side elevation, with portions broken away and partially shown in section, of a first modification of the compost collector;

FIG. 7 is a fragmentary end elevation of the support member for the drain pipe disclosed in FIG. 6;

FIG. 8 is a side elevation of a second modification of the compost collector installed in a sink drain system including a food disposer;

FIG. 9 is a section taken along the line 9—9 of FIG. 8, with portions broken away;

FIG. 10 is a fragmentary side elevation of a third modification of the compost collector installed in a drain system, including a sink drain system including a food disposer;

FIG. 11 is a section taken along the line 11—11 of FIG. 10, with portions broken away; and FIG. 12 is a fragmentary section taken along the line 12—12 of FIG. 11.

DESCRIPTION OF THE PREFERRED EMBODIMENTS

Referring now to FIGS. 1 – 5, the organic compost collector 10 is disclosed installed in a drain system 11 for a sink 12. The drain system 11 includes a sink drain outlet or opening 13 from which depends the drain outlet conduit 14, which is in communication with the compost collector 10. The effluent from the compost collector 10 discharges through drain discharge pipe 15 and trap 16 to the main drain pipe 17 having a vent 18.

In this particular modification, the drain system 11 includes a by-pass conduit 20, the upper end of which is in fluid communication with the drain outlet conduit 14 and the lower portion of which merges into the trap 16 and is joined to the discharge drain pipe 15.

The compost collector 10 includes a solid-wall housing or receptacle comprising a bottom housing section 22 and a top section or cap 23. The cap 23 is detachably secured to the bottom housing section 22 by any convenient structure. As best disclosed in FIGS. 1–4, the cap 23 is provided with circumferentially spaced channels 24, opening radially inward, to slidably engage slotted peripheral flanges 25. When the cap 23 is rotated to a position in which the channels 24 vertically register with the slots 26 in the circumferential flange 25, then the cap 23 may be disengaged from the housing section 22. By slight rotation of the cap 23 when the channels 24 are circumferentially aligned with the flanges 25, the channels 24 are moved out of registry with the slots 26 to slidably receive the flanges 25, thereby locking the cap 23 in firm engagement with the bottom housing section 22. A fluid-type seal between the cap 23 and the bottom wall section 22 is provided by the O-ring 27 (FIG. 2).

An inlet opening or hole 30 is formed in the top wall of the cap 23 for registry with the drain outlet conduit 14. Projecting laterally from the lower portion of the bottom housing section 22 is an outlet conduit 31.

Mounted on top of the cap 23 parallel to each other and on opposite sides of the inlet opening 31 are a pair of angle guide bars 33. The guide bars 33 are adapted to slide over the opposite longitudinal edges of a slide plate 34 fixed around the rim of the outlet 35 of the drain conduit 14. One end of the slide plate 34 is provided with an upstanding stop flange 36 to limit the movement of the slide bars 33 in that direction, and thereby permit the inlet opening 30 to register with the outlet opening 35 of the drain conduit 14. The fluid passage between the conduit outlet 35 and the inlet opening 30 is sealed by the O-ring 37 (FIG. 2).

Mounted on spacer blocks 39 within the bottom housing section 22 is a screen member in the form of a screen basket 40 having a lower cylindrical screen receptacle 41 and a frusto-conical screen lid 42, secured to the receptacle 41 by the fastener elements or clips 43. The screen basket 40 is substantially concentric within the housing 22. The lid or cover 42 is provided with an inlet opening 44 of substantially the same size and in registry with the inlet opening 30 of the housing cap 23.

Thus, when the collector 10 is properly installed any material, liquid or solid, in the sink 12 which is flushed down through the drain outlet 13 and drain conduit 14 discharges through the housing inlet opening 30 and the screen basket inlet opening 44 directly into the screen basket 40. The screen mesh in both the receptacle 41 and the lid 42 is of such size as to permit the free flow of water or other liquids and of only the finest solid particles through the walls of the screen basket 40. Thus, practically all of the solid matter passing through the inlet opening 30 is retained within the basket 40 until the basket 40 can be removed and emptied.

The outlet conduit 31 is preferably cylindrical and of a size slightly smaller than the discharge drain pipe 15 so that the discharge drain pipe 15 may telescopingly receive the outlet conduit 31, as disclosed in FIG. 3. A fluid-type seal is effected between the conduit 31 and the drain pipe 15 by the O-ring 47.

Preferably, the outlet conduit 31 is provided with a butterfly valve 48 journaled in the walls of the conduit 31 by shaft 49. The upper end of the shaft 49 is fixed to a camshaped lever 50 which is biased by spring 51 to the position disclosed in FIG. 5 so that the valve 48 closes the conduit 31, when the conduit 31 is separated or disengaged from the drain pipe 15. However, when the drain pipe 15 telescopingly receives the outlet conduit 31, the lever 50 is cammed toward the housing 22 by engagement with the end of the drain pipe 15, as disclosed in FIG. 2, to cause the valve 48 to move to an open position.

Thus, when the housing 22 is removed from the drain system 11, the valve 48 will automatically close to retain liquids within the housing 22 and thereby prevent dripping when the housing 22 is removed for emptying the screen basket 40. By the same token, when the collector 10 is re-installed, the valve 48 is automatically opened so that fluid communication between the housing 22 and the discharge drain pipe 15 is resumed.

Handle 52 may be fixed to the side wall of the housing section 22, on the side opposite the stop flange 36 and the drain pipe 15, to facilitate installation and removal of the collector 10 from the drain system 11.

In order to by-pass liquid discharged through the sink drain opening 13 through the by-pass conduit 20, a by-pass valve 53 is mounted in the drain conduit 14. The valve 53 is fixed to a lever handle 54 rotatably journaled through the walls of the conduit 14 so that when the lever handle 54 is in its solid-line position of FIG. 1, the valve 53 closes fluid communication between the drain conduit 14 and the by-pass conduit 20, but opens communication between the drain conduit 14 and the inlet opening 30 of the housing cap 23.

However, when the lever handle 54 is rotated to the phantom position 54' of FIG. 1, the valve 53 is swung down to close fluid communication between the drain conduit 14 and the collector 10, but simultaneously establishes fluid communication between the drain conduit 14 and the by-pass conduit 20.

The lever handle 54 is also provided with a stop lug 56 so positioned that it is in alignment with the end of one of the slide bars 33, when the lever handle 54 is in the solid-line position of FIG. 1. Thus, the lug 56 effectively locks the housing 22 in its installed position when the valve 53 opens fluid communication between the sink 12 and the collector 10.

The operation of the organic compost collector 10 is readily apparent from the above description.

When the collector 10 is in its installed position disclosed in FIGS. 1–3, all liquids and solid matter deposited in the sink 12 discharge through the drain opening 13, pass through the drain conduit 14, housing inlet 30 and screen basket inlet 44 to trap all solid particles of a size greater than the mesh of the screen walls of the basket 40. All liquid and any fine particles capable of penetrating the walls of the screen basket 40, flow through the screen basket 40 and are discharged through the conduit 31 into the drain pipe 15, trap 16 and main drain pipe 17.

The housing 22, as well as the cap 23, may be made of transparent material so that the level of solid material 45 within the screen basket 40 is always readily observable. If the walls of the housing 22 and cap 23 are opaque, then the level can be determined by looking down through the drain opening 13 and conduit 14.

When the screen basket 40 is full, lever handle 54 is rotated to the position 54' in FIG. 1, so that the valve 53 will automatically close passage of any more solid or liquid material through the conduit 14 and the outlet 35. Such material will now flow through the open by-pass conduit 20 ultimately to the main drain pipe 17. When the lever handle 54 is raised, the locking lug 56 is removed from the path of the guide bars 33, so that by manually pulling the handle 52, the collector 10 is removed from the drain system 11. As previously mentioned, the disengagement of the outlet conduit 31 from the drain pipe 15 automatically permits the actuation of the cam lever 50 to close the valve 48.

After removal of the collector 10, the cap 23 is rotated slightly to disengage the channels 24 from the flanges 25, the cap 23 is removed, and then the screen basket 40 is removed. The clips 43 are unfastened to remove the screen lid 42, and the contents of the screen receptacle 41 are discharged either into an appropriate container for storing the organic compost 45, or discharged directly upon the soil desired to be fertilized, such as around the plants of a vegetable or flower garden. The screen lid 42 is then re-fastened to the screen receptacle 41, and the screen basket 40 placed back into the housing 22 and closed by the cap 23. The handle 52 is then grasped and the collector 10 manipulated to cause the guide bars 33 to slide back over the slide plate 34 until the guide bars 33 engage the stop flange 36 and the outlet conduit 31 moves into the end opening of the drain pipe 15, thereby automatically re-opening of the valve 48. Then the handle lever 54 is returned to its solid-line position, and the collector 10 is ready for collecting additional organic compost 45.

The modification disclosed in FIGS. 6 and 7 includes a collector 60 comprising a bucket-shaped, or frusto-conical shaped, solid-wall receptacle or housing 61. The housing 61 is preferably made of plastic material and has a central bottom opening 62. The top of the housing 61 comprises an open-end defined by the upper peripheral, circumferential edge 63 of the wall of the housing. The upper peripheral edge 63 is preferably made of a resilient material and lies generally in the same top horizontal plane.

Received within the housing 61 through the open top end of the housing 61 is a generally frusto-conical shaped screen basket 65 mounted in a basket frame 66. The basket frame 66 rests upon the bottom wall of the housing 61 to space the bottom wall of the screen basket 65, as well as the side wall of the screen basket 65, inwardly from corresponding walls of the housing 61. The top of the screen basket 65, as well as the frame 66, is below the top peripheral edge 63 when the screen basket 65 is mounted within the housing 61.

The drain pipe system 11 includes a vertical drain pipe section 68 terminating at its upper end in a collar 69, the upper edge 70 of which is flanged to seat snugly against the bottom wall 71 of the housing 61, and preferably concentrically of the bottom opening 62. The upper flange 70 of the collar 69 is also spaced from the bottom of the sink 12 a distance equal approximately the height of the housing 61. Thus, by inserting the collector 60 between the collar 69 and the bottom of the sink 12, the top peripheral edge of the housing 61 will seal snugly against the bottom surface of the sink 12, preferably concentrically around the drain opening 13, while the flange 70 of the collar 69 seats firmly and concentrically about the bottom opening 62.

In order to effect the seal between the housing 61, the sink 12 and the collar 69, the elbow 16' of the drain pipe system 11 is preferably biased upward, after the housing 61 is in its operative position disclosed in FIG. 6. This biasing may be effected by a jack 73 having a handle 74 and a channel-shaped recess 75 for receiving the elbow 16. An elastic button or seat 76 is formed in the bottom of the recess 75 to urge upward the elbow 16', thereby squeezing the flange 70 of the collar 69 upward into sealing engagement with the bottom wall 71 of the housing 61.

The operation of the collector 60 is essentially the same as the operation of the collector 10, but in a much more simplified form. After the collector 60 is assembled, and has been used sufficiently to fill the screen basket 65 with organic food waste, the jack 73 is moved laterally from beneath the elbow 16' by manually pulling the handle 74. The housing 61, free of squeezing pressure, is merely slipped laterally from between the collar 69 and the bottom of the sink 12. The screen basket 65 is removed and its contents emptied. The empty screen basket 65 is re-inserted into the housing 61, the entire collector 60 replaced in its operative position in FIG. 6, and the jack 73 restored to its position biasing upward the pipe 68 to re-seal the housing 61 between the sink 12 and the collar 69.

In the event that the sink 12 is to be used, while the collector 60 is removed, a stopper 77 is provided for closing the sink drain opening 13.

The collector 80 disclosed in FIGS. 8 and 9 is essentially of the same construction as the collector 10, with the exception of the inlet and outlet connections. The collector 80 is designed to be connected to the outlet pipe 81 of a conventional food disposer 82, which in turn is connected by the inlet pipe 83 to the drain opening of the sink 12.

The outlet pipe 81 from the food disposer 82 is telescopingly received in the open end of drain pipe 85 which extends horizontally from the outlet pipe 81, then forms an elbow with a depending vertical section. Extending horizontally normal from the horizontal section of the drain pipe 81 is a conduit 86 telescopingly and sealingly received within an elbow-shaped inlet fitting 87. The bottom opening of the elbow fitting 87 is provided with a flange 88 identical in function to the flange 34 of the collector 10 for slidably receiving the guide flanges 33'.

A by-pass valve 90 is mounted for rotatable movement about a vertical axis in the pipe section 85 and adapted to be rotated by the handle 91. The valve 90 may be swung between the solid-line position disclosed in FIG. 9 for closing the inlet conduit 86 to the collector 80 and for opening the by-pass passage through the drain pipe 85, and the dashed-line position of FIG. 9 closing the by-pass passage through inlet conduit 86 into the collector 80.

The discharge drain pipe 15' is identical to the drain pipe 15 of the collector 10 for draining liquid from the collector 80 into the vertical section of the drain pipe 85.

The valve handle 91 may be provided with a coil spring 92 to provide sufficient frictional resistance to the turning of the handle 91 in order to retain the valve 90 in the position to which it is moved by manipulation of the handle 91.

Otherwise, the operation of the collector 80 is substantially the same as the operation of the collector 10.

The collector 100 disclosed in FIGS. 10–12 is also connected to the food disposer 82 in the same manner that the collector 80 is connected to the food disposer 82. However, in order to collect the food waste material, and maintain it submerged in liquid, the drain outlet conduit 101 is located in the upper portion of the receptacle 100, specifically in the top wall of the cap 102. The cap 102 of the collector 100 may be screw fitted to the bottom housing section 103 in the same manner as the cap 23 is secured to the bottom housing section 22 of the collector 10. The cap 102 has no upper securing flange, similar to the flanges 33 of the collector 10, but is provided with an elbow inlet fitting 104 identical to the elbow fitting 87 of the collector 80 for telescopingly and sealingly, receiving the inlet conduit 86.

Instead of a screen basket within the housing 103, a short screen member or screen sheet 106 has one edge fixed to the side wall of the cap 102 and projects laterally, and somewhat arcuately upwardly, across and below the outlet opening 107 communicating with the outlet conduit 101.

The outlet conduit 101 is fitted into an outlet branch pipe 108 which is tapped into the depending leg or section of the drain pipe 85. The outlet conduit 101 may also be provided with the same automatic closure valve 48' and cam lever 50', as the valve 48 and cam lever 50 of collector 10.

The discharge fluids from the food disposer 82 are diverted by the position of the valve 90 within the drain pipe 85 and inlet conduit 86, in the same manner that they are diverted to and from the collector 80.

The collector 100 may be provided with a stop lug 110 for limiting the movement of the handle 91 in its solid-line position disclosed in FIG. 11.

Instead of the attachment plate 34 and guide flanges 33, of collector 10, the collector 100 may be supported upon a platform 112.

Otherwise, the collector 100 functions in substantially the same manner as the collector 80. However, when the collector 100 is removed from the conduits 86 and 108, and the cap 102 is detached from the bottom housing section 103, the organic compost will be in a fluid state, because of the immersion of the solid food waste material within the water in the bottom housing section 103.

What is claimed is:

1. An organic compost collector for a sink drain system including a sink, a sink drain outlet, and sink drain pipe, comprising:
    a. a receptacle having a solid enclosure wall defining a chamber for receiving effluent from said sink,
    b. an inlet opening in said wall adapted to be detachably connected in said drain system in fluid communication with said sink drain outlet,
    c. an outlet opening in said wall adapted to be detachably connected in said drain system in fluid communication with said drain pipe,
    d. a screen member porous to liquids, said screen member being a barrier to the passage of solid waste material larger than a predetermined size, and
    e. means mounting said screen member within said chamber and in the path of effluent moving toward said outlet opening, to retain said solid waste material larger than said predetermined size within said chamber.

2. The invention according to claim 1 in which said screen member comprises a screen receptacle, said mounting means comprising means for supporting said screen receptacle within said chamber, said screen receptacle being large enough to occupy substantially all the space within said chamber, said solid wall receptacle being formed in two complementary sections, and means for detachably connecting said sections for removal of said screen receptacle, said screen receptacle having an opening in fluid communication with said inlet opening.

3. The invention according to claim 2 in which said sections comprise a top section and a bottom section, said inlet opening being formed in said top section, and connector means for detachably connecting said top section to said sink drain outlet.

4. The invention according to claim 3 in which said outlet opening is in said bottom section, and second connector means detachably connecting said drain pipe to said outlet opening.

5. The invention according to claim 4 in which said outlet opening comprises an outlet conduit opening through the wall of said bottom section, said outlet conduit being adapted to telescopingly engage an open end of said drain pipe, a valve within said outlet conduit adapted to move between a closed position and an open position, actuator means operatively connected to said valve and adapted to be actuated by the movement of said drain pipe telescopingly engaging said outlet conduit to move said valve to said open position, said actuator means being actuated by the separation of said drain pipe from said outlet conduit to move said valve to a closed position.

6. The invention according to claim 5 in which said drain pipe is larger than said outlet conduit and telescopingly receives said outlet conduit, and said actuator means comprises a cam adapted to engage and disengage the telescoping end of said drain pipe.

7. The invention according to claim 3 in which said sink drain outlet includes a drain conduit, said means for detachably connecting said top section to said drain outlet comprising connector means for detachably connecting said top section to said drain conduit so that said drain conduit and said inlet opening are in fluid communication, a by-pass conduit communicating with said drain conduit, a valve in said drain conduit, and means for moving said valve between a position closing said by-pass conduit and opening said drain conduit and a position closing said drain conduit and opening said by-pass conduit.

8. The invention according to claim 7 in which said means for moving said valve comprises an exterior lever handle, said means for detachably connecting said top section to said drain conduit comprising horizontal track means fixed to said drain conduit and horizontally disposed runners on said top section for slidably engaging said track means, stop means on said lever handle adapted to block the slidable movement of said runners relative to said track means, when said valve is in said position closing said by-pass conduit.

9. The invention according to claim 2 in which said inlet opening comprises a rim adapted to press fit into sealing engagement with the bottom of said sink around said drain outlet, an open-ended fitting fixed to an open end of said drain pipe and adapted to press fit in sealing engagement around the outlet opening of said receptacle, and means for biasing said drain pipe toward said receptacle to squeeze said receptacle between said fitting and said sink.

10. The invention according to claim 1 in which a waste disposal having an inlet conduit is in fluid communication with said sink drain outlet and a disposal outlet conduit, and connector means for connecting the inlet opening of said receptacle to said disposal outlet conduit.

11. The invention according to claim 1 in which said outlet opening and said inlet opening are in the top portion of said receptacle, and said screen member is fixed to said wall in the upper portion of said receptacle and projects across said receptacle slightly below said outlet opening.

12. The invention according to claim 1 further comprising valve means for closing the passage of fluid within said drain system between said sink drain outlet and said inlet opening.

13. The invention according to claim 12 in which said sink drain outlet comprises a drain conduit, detachable means for connecting said inlet opening to said outlet conduit, a by-pass conduit having one end in fluid communication with said drain conduit and its opposite end in fluid communication with said drain pipe, said valve means comprising a valve member in said drain conduit, and means for moving said valve member to a first position opening fluid communication between said sink drain outlet and said inlet opening and closing said by-pass conduit, and a second position opening said by-pass conduit in fluid communication with said sink drain outlet and closing said inlet opening.

* * * * *